Patented July 14, 1942

2,289,966

UNITED STATES PATENT OFFICE 2,289,966

REAGENT REGENERATION PROCESS

Karl M. Herstein, New York, N. Y., assignor to Acrolein Corporation, a corporation of Delaware No Drawing. Application January 27, 1940,
Serial No. 315,973

3 Claims. (Cl. 23—117)

This invention relates to the regeneration of mercuric sulfate reagents and more particularly it relates to the regeneration of a mercuric sulfate reagent used in the production of acrolein by the interaction of propylene with the mercuric sulfate reagent.

In my copending applications Serial Nos. 221,629 and 296,771, I have described processes for producing acrolein by the interaction of propylene with a reagent containing mercuric sulfate and sulfuric acid. The overall equation for the reaction which takes place between these materials is believed to be as follows:

The spent reagent thus contains sulfuric acid and a precipitate of mercurous sulfate, together with traces of various organic impurities.

My invention provides a process which is particularly advantageous for converting the mercurous sulfate of the spent reagent into mercuric sulfate which may then be used in preparing fresh reagent for the production of acrolein from propylene. My process comprises separating the mercurous sulfate from the spent reagent and then oxidizing it with fuming sulfuric acid to convert the mercurous sulfate into mercuric sulfate. The mercuric sulfate is separated from the reaction mixture and used in the production of fresh reagent.

Fuming sulfuric acid reacts quite vigorously with mercurous sulfate under proper conditions. The fuming acid is generally considered to be a solution of sulfur trioxide in concentrated sulfuric acid. The reaction between mercurous sulfate and the fuming acid may therefore be summarized by the following equation:

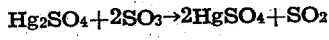

It will be observed that the only products of the reaction are mercuric sulfate and sulfur dioxide. No water, either in the form of steam or otherwise, is given off by the reaction. In this respect the action of fuming sulfuric acid differs from that of concentrated sulfuric acid. When the concentrated acid reacts with mercurous sulfate, considerable quantities of water are produced in addition to sulfur dioxide, as is shown by the following equation which summarizes the reaction between mercurous sulfate and concentrated sulfuric acid:

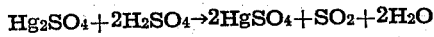

The water dilutes the concentrated sulfuric acid and impairs its effectiveness as an oxidizing agent. To minimize such dilution it is necessary to heat the reaction mixture containing the concentrated acid in order to drive off the water as fast as it is formed. This is unnecessary when fuming sulfuric acid is used and consequently savings in fuel cost may thus be made.

When using the concentrated acid some of the water formed is evolved in admixture with the sulfur dioxide generated, and, of course, where the concentrated acid is heated to prevent its dilution considerable quantities of steam or water vapor will be associated with the sulfur dioxide given off by the reaction. The presence of these substantial quantities of water in the sulfur dioxide evolved is a serious drawback if it is desired to convert the sulfur dioxide into sulfur trioxide to produce concentrated or fuming sulfuric acid since such a conversion, to be effective, requires substantially dry sulfur dioxide. The sulfur dioxide evolved when fuming sulfuric acid is used to oxidize mercurous sulfate is dry and consequently it is readily adapted for conversion into sulfur trioxide whereas the sulfur dioxide evolved when using concentrated sulfuric acid must be dried before it can be effectively converted into sulfur trioxide.

The reaction between fuming sulfuric acid and mercurous sulfate also takes place at a considerably lower temperature than the reaction between mercurous sulfate and concentrated sulfuric acid. Economies in fuel cost may thus be effected by using the fuming acid.

In carrying out my process the precipitate of mercurous sulfate is separated from the spent reagent by any suitable means, e. g., decantation, filtration, centrifuging, etc. The mercurous sulfate is then advantageously dried and thereafter added to heated fuming sulfuric acid. A vigorous reaction takes place and considerable quantities of sulfur dioxide are evolved. The mercuric sulfate produced is in the form of a precipitate which may be recovered from its acid mother liquor by any suitable means, e. g., by decantation, and then reused to prepare fresh reagent for the production of acrolein.

The sulfur dioxide evolved during the reaction may be oxidized to sulfur trioxide by the contact process or any other suitable process. The sulfur trioxide may then be used to produce sulfuric acid or to produce fuming sulfuric acid, which may in turn be used to oxidize additional mercurous sulfate.

The fuming sulfuric acid used in practicing the invention advantageously contains about 10% to about 40% or more by weight of sulfur trioxide, although fuming acids of lower sulfur trioxide concentration may also be used.

The temperature to which the fuming sulfuric acid is heated prior to the addition of mercurous sulfate varies considerably, depending upon the concentration of the fuming sulfuric acid used in practicing the invention. In general, lower temperatures should be used with strong fuming acids than with weak fuming acids. The temperature should not exceed the boiling point of the acid and advantageously should not be so high as to cause substantial quantities of sulfur trioxide to be evolved from the fuming acid.

The proportions of fuming sulfuric acid used in treating a given quantity of mercurous sulfate should in general be such that a substantial excess of fuming sulfuric acid is present, although it is of course to be understood that the process may be carried out with substantially no excess of the acid.

My invention will be further described by reference to the following specific examples, these examples being referred to solely by way of illustration and not by way of limitation:

About 5 parts of mercurous sulfate recovered from a spent reagent are added to about 30 parts of 20% fuming sulfuric acid which has been heated to a temperature of about 130° to 140° C. The solution should be vigorously stirred. After about ten minutes the reaction between the fuming acid and the mercurous sulfate is substantially complete. The mercuric sulfate formed is deposited as a precipitate in the bottom of the reaction vessel and it is separated from the reaction liquor by decantation. The separated mercuric sulfate may then be admixed with the proper quantity of sulfuric acid and reused in the production of acrolein.

As a further example of my process, about 5 parts of mercurous sulfate separated from a spent reagent are added to about 30 parts of 10% fuming sulfuric acid which has been heated to a temperature of about 160° to about 165° C. The solution should be vigorously stirred. After about 35 minutes the reaction between the fuming sulfuric acid and the mercurous sulfate is substantially complete. The mercuric sulfate produced is deposited as a precipitate and it is separated from the reaction liquor by decantation. The separated mercuric sulfate may then be used in the production of fresh reagent for producing acrolein.

It will thus be seen that the invention provides a process by which mercurous sulfate from a spent reagent may be effectively oxidized to mercuric sulfate. The economies in fuel cost made possible by the process may be augmented by further economies resulting from the oxidation of sulfur dioxide evolved during the process to sulfur trioxide which in turn may be used to produce fuming sulfuric acid for use in the process.

I claim:

1. In the regeneration of an acid mercuric sulfate reagent used to produce acrolein from propylene with the production of a spent reagent containing mercurous sulfate, the steps which comprise separating the mercurous sulfate from the spent reagent and oxidizing the mercurous sulfate with fuming sulfuric acid to produce mercuric sulfate for reuse in the process, said fuming sulfuric acid containing an amount of sulfur trioxide in excess of that required to oxidize the mercurous sulfate to mercuric sulfate.

2. In the regeneration of an acid mercuric sulfate reagent used to produce acrolein from propylene with the production of a spent reagent containing mercurous sulfate, the steps which comprise separating mercurous sulfate from the spent reagent and oxidizing the mercurous sulfate with heated fuming sulfuric acid to produce mercuric sulfate for reuse in the process, said fuming sulfuric acid containing an amount of sulfur trioxide in excess of that required to oxidize the mercurous sulfate to mercuric sulfate.

3. In the regeneration of an acid mercuric sulfate reagent used to produce acrolein from propylene with the production of a spent reagent containing mercurous sulfate, the steps which comprise separating the mercurous sulfate from the spent reagent, oxidizing the mercurous sulfate with heated fuming sulfuric acid and recovering the mercuric sulfate produced, said fuming sulfuric acid containing an amount of sulfur trioxide in excess of that required to oxidize the mercurous sulfate to mercuric sulfate.

KARL M. HERSTEIN.